(12) United States Patent
Barbier (10) Patent No.: US 6,664,558 B1
(45) Date of Patent: Dec. 16, 2003

(54) NON-PRISMATIC OPTICAL LIQUID LEVEL SENSING ASSEMBLY

(75) Inventor: William J. Barbier, Hazelwood, MO (US)

(73) Assignee: Concept Technology Inc., Hazelwood, MO (US)

( * ) Notice: Subject to any disclaimer, the term of this patent is extended or adjusted under 35 U.S.C. 154(b) by 0 days.

(21) Appl. No.: 10/269,231

(22) Filed: Oct. 11, 2002

Related U.S. Application Data (60) Provisional application No. 60/347,856, filed on Nov. 7, 2001.

(51) Int. Cl.[7] .............................................. G01N 15/06
(52) U.S. Cl. ...................................... 250/577; 250/216
(58) Field of Search ................................. 250/577, 574, 250/573, 216; 73/1.31, 1.73, 293; 340/450, 555–557, 612, 618, 619; 356/73

(56) References Cited

U.S. PATENT DOCUMENTS

| | | | | |
|---|---|---|---|---|
| 4,354,180 A | * | 10/1982 | Harding ...................... 340/619 |
| 4,840,137 A | * | 6/1989 | Beauvais et al. ............ 116/227 |
| 5,072,595 A | * | 12/1991 | Barbier ......................... 62/129 |
| 5,278,426 A | * | 1/1994 | Barbier ......................... 250/577 |

* cited by examiner

*Primary Examiner*—Que T. Le
(74) *Attorney, Agent, or Firm*—Daniel Kramer

(57) ABSTRACT

An optically based liquid level (liquid-vapor) detector for use with a window having a substantially planar side facing the liquid-vapor side and a substantially planar side positioned parallel to the liquid-vapor side facing the outside. The detector comprises a light source positioned on the outside of the window to direct its light through the outside planar side to the inside planar liquid-vapor side and a light detector positioned on the outside of the window to receive light transmitted from the source and returned from the planar liquid-vapor window side. The detector further includes electronic means for detecting the light intensity change affecting the transducer, from the condition of liquid on the liquid-vapor side, to the condition of vapor on the liquid-vapor side of the window, whereby an action or signal is generated in response to such change.

11 Claims, 4 Drawing Sheets

*Fig. 7A*

*Fig. 8A*
LED
RADIANT INTENSITY VS
ANGULAR DISPLACEMENT

*Fig. 7B*

*Fig. 8B*
DETECTOR
RESPONSE VS
ANGULAR DISPLACEMENT

NON-PRISMATIC OPTICAL LIQUID LEVEL SENSING ASSEMBLY

PRIORITY: Applicant claims priority based on disclosures contained in Provisional Patent Application Ser. No. 60/347,856 filed Nov. 7, 2001 (Nov. 7, 2002).

Not Federally Funded: The research leading to this invention was not Federally Funded.

No Microfiche or other type of program is included in this application.

BACKGROUND

1. Field of the Invention

Liquid level within a tank means theine of transition from liquid to vapor since there is substantially always vapor residing above any liquid body. The discussion of optical detection of liquid level through a sight glass or window by a device or detector always means the discrimination by the detector positioned on one side of the window between the characteristics of vapor and the characteristics of liquid positioned on the other side of the window. Most sight glasses or windows that are provided for visual monitoring of liquid level in a tank or vessel, such as a compressor crankcase, consist of two substantially planar parallel sides, one facing the liquid-vapor side and one facing the outside. Prior art designs directed to detecting a change from vapor to liquid have either employed floats immersed in the liquid for situating a switch or have employed a window with a prism formed in the liquid-vapor side of the window to interact with a light source and light sensor or transducer for returning to the transducer a high percentage of the light emitted by the light source when only vapor was present on the prism side of the window and for returning very little light to the transducer when only liquid was present on the prism side of the window. Such prism faced windows are not often found on vessel sight glasses.

Therefore this invention is directed toward an optically based liquid level (liquid-vapor) detector for use with a window having a substantially planar side facing the liquid-vapor side and a substantially planar side positioned parallel to the liquid-vapor side facing the outside. The detector comprises a light source positioned on the outside of the window to direct its light through the outside planar side to the inside planar liquid-vapor side and a light detector positioned on the outside of the window to receive light transmitted from the source and returned from the planar liquid-vapor window side. The invention further includes electronic means for detecting the light intensity change affecting the transducer, from the condition of liquid on the liquid-vapor side, to the condition of vapor on the liquid-vapor side of the window, whereby an action or signal can be generated in response to such change.

2. Prior Art

Barbier U.S. Pat. No. 5,072,595 in FIG. 1 teaches a bubble detector for a flow stream having a cavity or chamber positioned above and connected to the flow stream for trapping and accumulating bubbles, the chamber including a window having a prism shape formed on the chamber side and a planar face on the outside and a light emitter 66 directing light through the planar face and toward the prism and a light transducer 68 detecting light returned from the prism. When there is liquid surrounding the prism, little light is returned to the light transducer but when bubbles surround the prism, the prism returns much more light to the transducer. Electronic apparatus detects the light intensity and acts in response thereto. In FIG. 3 Barbier teaches a bubble collecting chamber having a planar face on the chamber side but having a prism shaped face on the outside where the light source 66 directs its light against one outside prism face and the light transducer 68 is positioned to receive light from another prism face. The planar face on the bubble or chamber side acts like a 90 degree prism because the light path from source to transducer impacts the planar face at a 45 degree angle and, in the absence of liquid or the presence of bubbles is reflected from the planar face at a 45 degree angle.

Barbier U.S. Pat. No. 5,276,426 teaches only a liquid-vapor discriminator having a window having a prismatic face on the liquid-vapor side and a outer planar face. A light source delivers its light from the outer planar face to the inner prism face where light is reflected in greater or lesser intensity from the prism face to a light detector adjacent the outer planar face.

Harding U.S. Pat. No. 4,354,180 teaches a liquid-vapor discriminating optical device where a window is positioned adjacent the liquid-vapor chamber. The window has a conical or prismatic face on its inner or liquid-vapor side and a substantially planar face on the outside. A light source is positioned on the outside directed primarily against the planar face and a light transducer is positioned on the outside adjacent another position on the planar face where a transition from vapor to liquid on the prism side of the window changes the fraction of light emitted by the light source that is reflected to the light transducer. Reflecting means are also taught that provide a substantially constant light return from source to transducer that acts as a reference.

Objects and Advantages

A primary objective is to provide an economical optical liquid level sensing construction where the glass aperture or window has a flat internal surface in contact with the liquid and vapor instead of a more expensive conical prism-shaped surface in contact with the liquid level being sensed.

A second primary object is to provide an optical-electronic liquid level sensor assembly that can be installed adjacent a window or sight glass in a vessel which is primarily positioned to provide visual indication from the outside of the vessel of the presence inside the vessel of liquid or vapor at the window.

A further object is to proved such a sensor that employs an LED as the light emitter or source and a Darlington Transistor unit as the light transducer or detector.

A further object is to provide such a level sensor assembly which operates effectively when the window has a non-prismatic planar surface facing the liquid-vapor side.

A further object is to provide such a level sensor assembly when the window has a non-prismatic planar surface facing the outside.

A further object is to provide such a level sensor assembly when the window planar liquid-vapor or inside surface is substantially parallel to the outside planar surface.

A further object is to provide such a level sensor where the axis' of the light emitter and the light transducer are parallel and substantially perpendicular to the plane of the outside window surface.

A further object is to provide such a level sensor where the light emitter and the light sensor are close to each other and separated by an opaque light barrier.

A further object is to provide such a level sensor where the axis' of the light emitter and the light transducer converge at a point on the liquid-vapor inside surface of the window.

SUMMARY OF THE INVENTION

An assembly, including a walled vessel having a window, for opto-electrically differentiating between the presence of liquid and vapor within the vessel at the window, the window having a planar interior face and a planar exterior face substantially parallel with the planar interior face and further providing an electrically actuated light source outside the window positioned to direct light toward the outside surface of the window and an electrically reactive light sensor outside the window positioned to receive light from the source reflected from the window inside surface, the reflected light having a greater intensity on the presence of vapor at the window interior and lesser intensity on the presence of liquid at the window interior and electrical means for reacting differently to the greater and the lesser reflected light intensity.

BRIEF DESCRIPTION OF THE DRAWINGS

In the following descriptions and throughout the specification the term LED is employed to identify the complete LED package including the LED active element, a light focusing lens, the polymer encapsulation, if used, and the electrical leads or wires employed to bring electricity to the LED package. Where the internal elements are addressed, they are identified as such.

FIG. 7B shows a low oil level and the resultant higher intensity of light reflected from the window inner surface back to the detector. FIG. 7B also shows that with substantial light reflected back to the module the sensitive cone of response or sensitivity of the detector is ineffective to cause its response when the axis' of the LED and detector are perpendicular to the window surface and spaced relatively far apart.

FIG. 7D also shows a bullet shaped detector.

DETAILED DESCRIPTION OF THE PREFERRED EMBODIMENT

Figures 1, 2, 3, 3A, 3B:
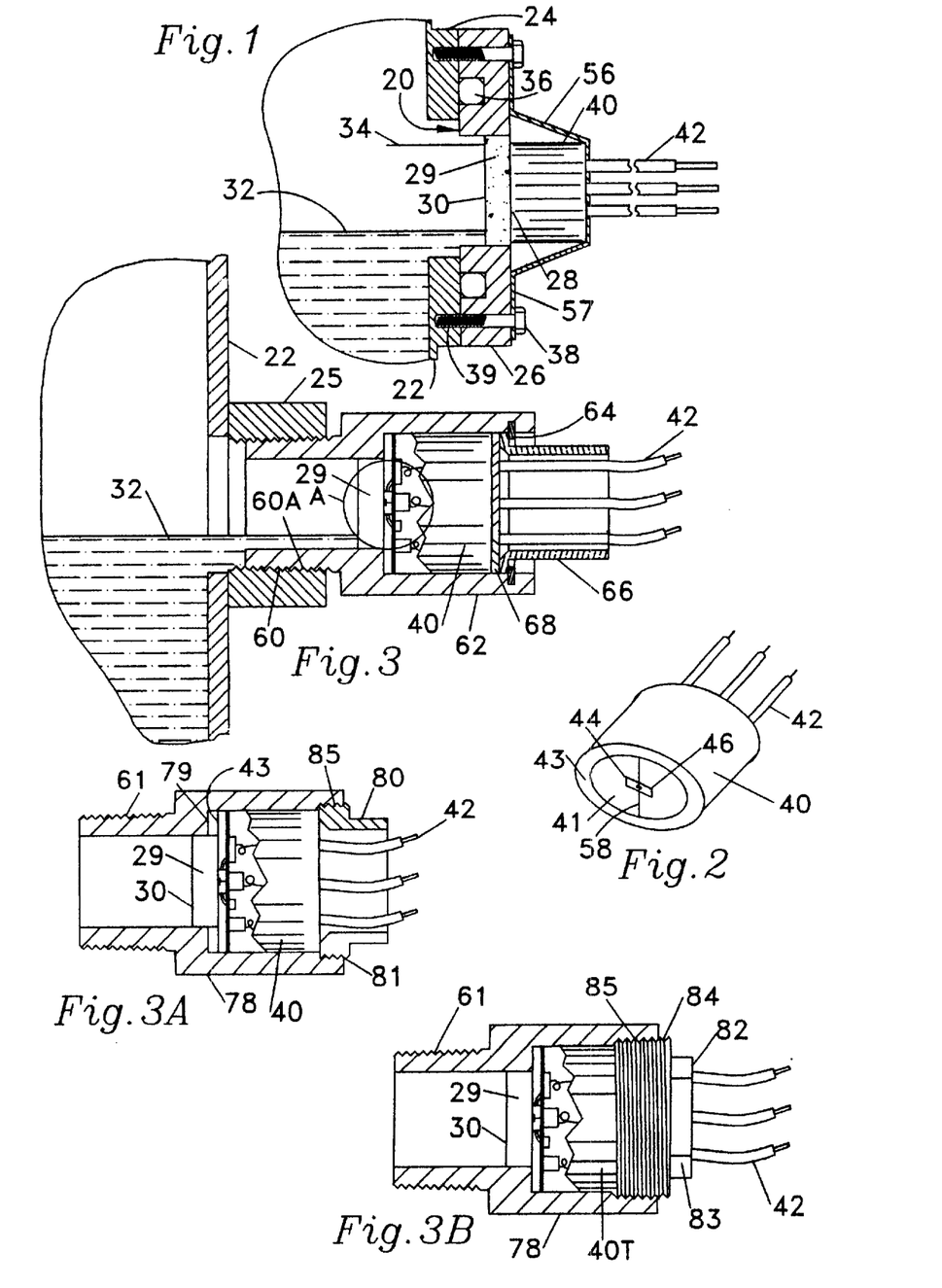
FIG. 1 illustrates typical construction of a portion of a refrigeration compressor crankcase and a flanged oil sight glass or window assembly having planar inner and outer sight glass or window faces and a module of the invention positioned on the exterior of the window for detecting high oil level 34 or low oil level 32.
FIG. 2 is an isometric view of the module of FIG. 1 showing the LED light source and the light detector positioned closely adjacent each other with an intermediate light barrier.
FIG. 3 is a side view of a screw-in fitting having an integral planar-planar window and an opto-electrical module of the invention positioned to detect high or low oil level, where the module is secured in the sight glass fitting with a snap ring and a partial cross section illustrating an internal circuit board with LED and detector positioned against the outer window face.
FIG. 3A illustrates a planar sight glass with a screw-in ferrule for pressing the opto-electric module against the outer sight glass surface.
FIG. 3B shows a module having external threads for screwing directly into a sight glass fitting.

In FIG. 1 there is shown a portion of a liquid holding tank 22, such a compressor oil-holding crankcase, having an opening in the tank side. The level of the liquid in the crankcase-tank-vessel is considered critical. The opening is positioned so that the critical liquid level is at or about the horizontal centerline of the opening. The opening is framed by a circular boss or projection 24. Boss 24 is provided with several threaded holes 39. A cover plate 20 for the opening has a flange 26 with a transparent window 29 sealed to the flange central portion so that the position of window 29 allows visual observation of a range of liquid levels 34, above and 32, below the critical level within tank 22.

In the following description the term 'inner', as applied to a window, means the side of the window 29 in contact with the liquid in tank 22 when the liquid level is higher or in contact with the vapor residing above the liquid in tank 22 when the liquid level is lower. The term 'outer' means the side of the window 29 that is normally in contact with the atmosphere and to which the module or construction of the invention is applied.

Window 29 is formed with an outer planar face 28 and an inner planar face 30. Inner planar face 30 is substantially parallel to outer planar face 28. Flange 20 bearing window 29 is secured to boss 24 of tank 22 by bolts 38 that engage and screw into threaded holes 39 of boss 24. O-ring 36 is positioned in a circular groove provided in flange 20 to provide an effective seal against leakage past flange 20 of the liquid and vapor within tank 22.

Abortive past efforts have been made to provide opto-electronic means for remotely reporting whether the liquid level in tank 22 was higher than, 34, or lower than, 32, the critical level employing the window 29 with its planar parallel inner 30 and outer 28 faces. The term 'reporting' here is intended to include the lighting of lights, sounding of alarms or the automatic instigation of some other informative or corrective action such as adding more liquid, draining off liquid, stopping a motor, starting a timer and so forth.

These efforts, represented by prior art described above, all were found to require replacing the planar/planar faced window with a window having either a prismatic inner face or a prismatic outer face and positioning the light detector a distance away from the light source. (Barbier U.S. Pat. No. 5,072,595).

The module of the invention overcomes the necessity of replacing the standard planar-planar window with a special window having either a prismatic or conical inner or prismatic or conical outer face.

FIG. 1 shows a module 40 of the invention simply positioned securely against planar outer surface of window 29. Module 40 is provided with electrical leads 42 that are intended to connect with appropriate power supply circuits and devices or elements to be controlled. Module 40 is secured against the outer planar face 28 of window 29 by bracket 56. Bracket 56 is in the form of a cup with flange parts 57 that are secured by bolts 38 thereby holding module 40 securely against exterior planar window face 28.

Figure 9A:
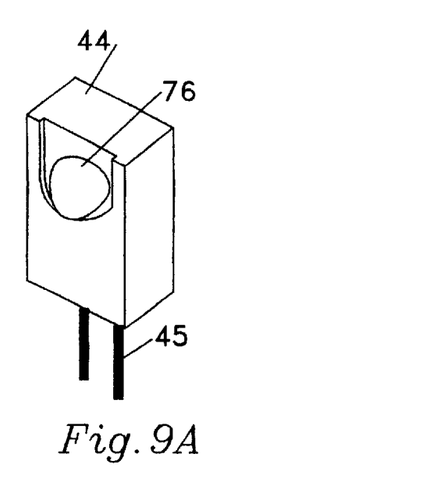
FIG. 9A shows the exterior shape of substantially externally identical LED and detector side-looking rectangular module packages.

FIG. 2 shows the active face 43 of module 40 in an isometric view. The active face 43 includes an LED or light producer 46 and a light detector 44 separated from the LED only by an opaque light barrier 58. Typically the LED is a small polymer package within which are encapsulated the light producing element and a lens. Typical LED capsules are manufactured by Fairchild Semiconductor Company in both a "side-looker" shaped package or capsule (FIG. 9A) and a "bullet" shaped package or capsule (FIG. 9B). The model QEE113 LED and the light detector capsule model QSE113 are the side-looker type where the LED is within a rectangular case (FIG. 9A). The side looker model QEE113 LED generates a light in the infrared having a wavelength in the region of 980 NM (nanometer). The side looker model number QSE133 light detector (FIG. 9A) has the same dimensions as the side looker QEE113 model LED. The light detector has a major sensitivity in the same 980 NM range. Other LED capsules suited for use in the invention are the bullet shaped QED233 or QED234 (FIG. 9B) both having a diameter of about 0.200 inches and a length of about 0.300 inches called a T1-3/4 package and a light detector in a similar package having the model QSC133.

The above side looking capsules are 0.175 by 0.2 inches on the active face and 0.1 inches thick with the dual leads coming from the 0.1×0.175 inch end. The active faces of both these side looking capsules are positioned substantially flush with the active module face 43 as shown in FIG. 2. An encapsulating or potting material 41 such as a polymeric material is employed to fix in position the components of the module 40 substantially flush with the module active face 43. The potting material may be either thermoplastic or thermosetting.

Referring now to FIG. 3 there is shown tank 22 having boss 25 with internal threads 60. A screw-in fitting 62 has threads 60A that conform to the internal threads 60 of the boss 25. The fitting 62 includes a window 29 having a planar interior face 30 and a substantially parallel planar exterior face 28. The window 29 of FIG. 3 may have identical dimensions with the window 29 of FIG. 1 or different dimensions, but the inner and outer surfaces are both planar and are substantially parallel to each other. The fitting 62 is provided with a cavity that allows module 40 to slide within until the active face 43 of module 40 is flush with and pressed against external planar surface 28 of window 29. A snap ring 64 is employed to hold an external ferrule 66 against a soft or compressible washer 68 for the purpose of securely positioning the active module face 43 and the accompanying active faces of the embedded LED 46 and detector 44 against the external face 28 of window 29.

Figures 4, 5, 6A, 6B:
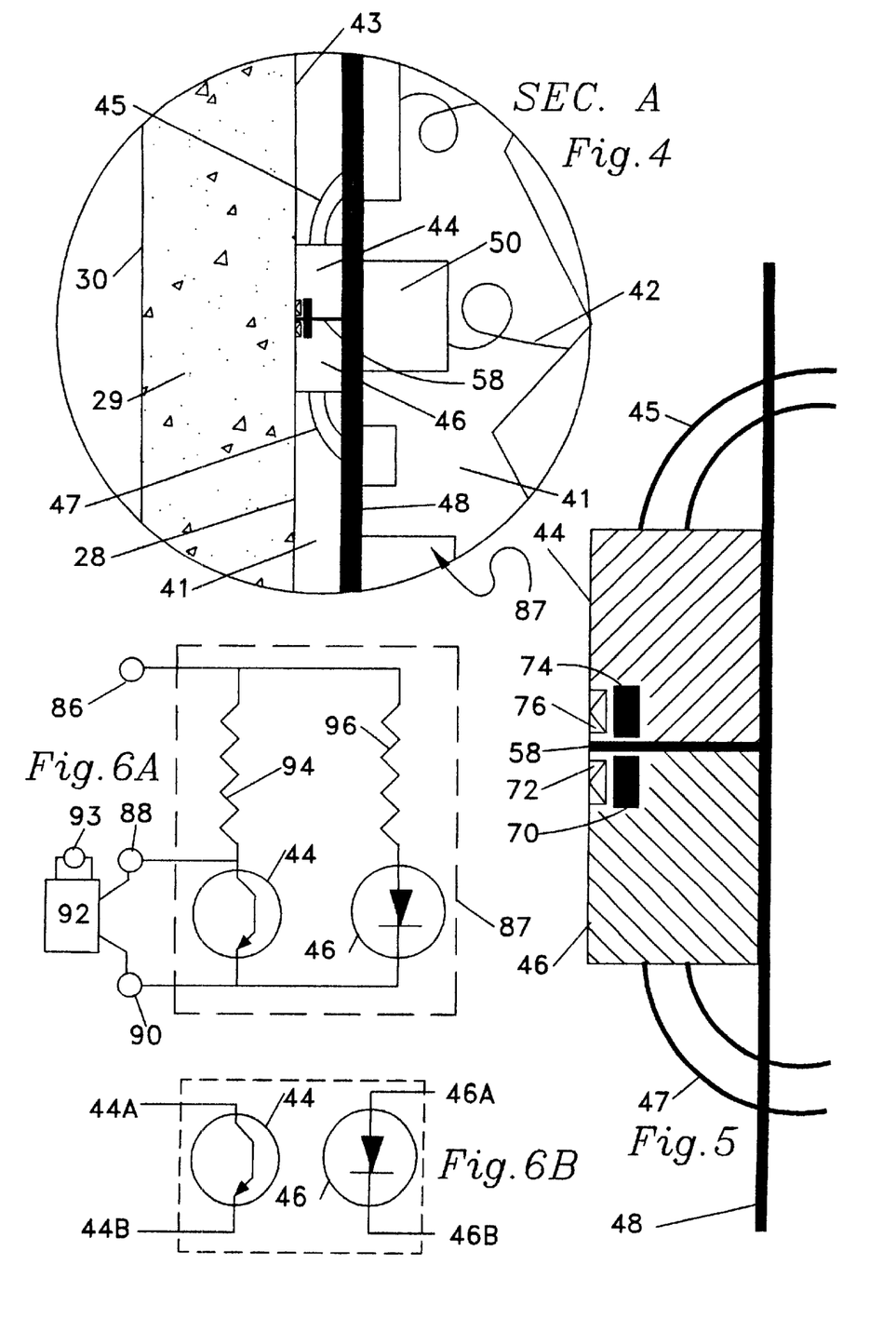
FIG. 4 (SEC-A) is a much magnified view of the sectioned portion of the module of the invention positioned against a planar-planar sight glass of FIG. 3.
FIG. 5 shows a greatly magnified view of the LED and detector of FIGS. 3 and 4.
FIG. 6A shows a rudimentary electronic circuit including the LED light source and the detector and an external device operated by the circuit to illustrate the principles.
FIG. 6B shows the LED and detector within the optical construction having external leads for connection to external electronics and relays.

In FIG. 3 a circular section-A is shown that is much enlarged in FIG. 4 as SEC-A to show construction details.

Other fitting designs for positioning and securing module 40 against the external planar surface 28 of window 29 are shown in FIG. 3A and 3B.

In FIG. 3A fitting 78 is provided with integral window 29 having a planar outer face 28 and a parallel planar inner face 30. Fitting 78 has external threads 61 for engaging and securing fitting 78 into boss 25 of tank 22 shown in FIG. 3. Fitting 78 is provided with a recess that accommodates module 40. In a preferred embodiment directed to constructions where window 29 has a smaller diameter than the diameter of module 40, window 29 protrudes slightly from a recessed shoulder 79 in fitting 78, thereby allowing the active face 43 of module 40 to seat snugly and reliably against the external planar surface 28 of window 29. Fitting 78 is provided with internal threads 85 into which sleeve 80, having external threads 82, is screwed, thereby providing means for forcing module 40 and its active face 43 securely against the external planar face 28 of window 29.

FIG. 3B displays substantially the same threaded fitting 78 as shown in FIG. 3A. However, in FIG. 3B module 40T is provided with external threads 84 to engage the internal threads 85 of fitting 78 thereby allowing the threaded sleeve 80 to be eliminated. Module 40T is provided with an external boss 82 having wrench flats 83, whereby a tool can be employed to tighten the threaded module 40T into fitting 78 and against external planar surface 28 of window 29.

In FIG. 4 (SEC-A is an enlarged detail of window 29 and module 40 of FIG. 3) window 29 is again shown having planar external surface 28 and substantially parallel planar inner surface 30. Pressed against the external planar surface 28 of window 29 is active surface 43 of module 40. LED 46 and light detector 44 are shown with their active faces positioned against window face 28 and separated by opaque barrier 58. While the opaque barrier 58 is shown as a discrete sheet-like element other forms of light barriers between the light source and light detector may be employed. The LED 46 and the light detector 44 are mounted to a circuit board 48 on the reverse side of which the operative resistors and other electronic elements 50 and the ends of the leads 42 are also mounted. Potting material 41 is identified by numeral but the volume filled with the potting material 41 is not hatched for clarity in displaying the other elements. While electronic elements are shown mounted on circuit board 48 positioned within module 40, in other embodiments of the invention a module 49 (FIGS. 5 and 6B) contains only the LED and light detector and the electronic components are positioned elsewhere. In further reference to FIG. 4, when the active elements LED 46 and detector 44 are mounted on a circuit board 48 the active face of the construction is the plane that resides or can reside against the planar outer 30 of window 29, even when there is no molding or potting composition provided. That is, in FIG. 4 the circuit board 48 is intended to provide the structural basis for the construction. In that construction the circuit board 48 with its mounted LED 46 and light detector 44, separated by a light barrier 58 with electronics 50 either positioned on the circuit board or elsewhere provide the basic elements of the invention. In such construction the snap ring 64 of FIG. 3 or the screw-in sleeve 80 of FIG. 3A are repositioned to hold the circuit board in position with its active elements, the LED and detector, against the outer surface 30 of window 29.

Figure 8A:
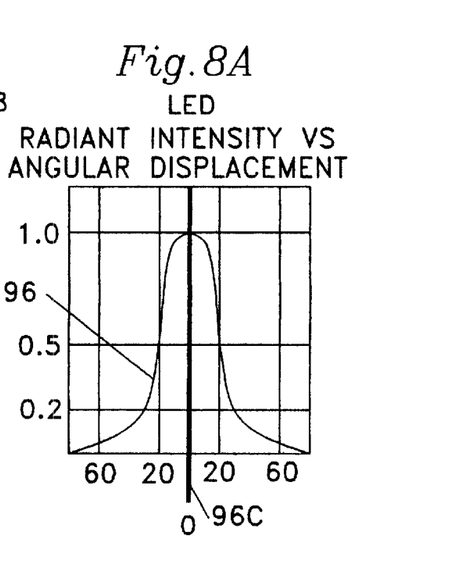
FIG. 8A is a graphical representation of the light intensity emitted by a typical LED as a function of angular displacement from the LED centerline.

FIG. 5 is a greatly enlarged crossection of the LED package or module 46 and the light detector package or module 44 showing their primary functional elements; LED module 46 has both the actual LED element 70 and the lens 72 that is employed to provide the desired conical light distribution pattern encapsulated within its package 46. In a preferred construction the actual light emitting parts 70 and 72 are positioned near one end of the package 44. A typical light intensity distribution for the LED package QEE113 as a function of the conical angle is shown in FIG. 8A.

Figure 8B:
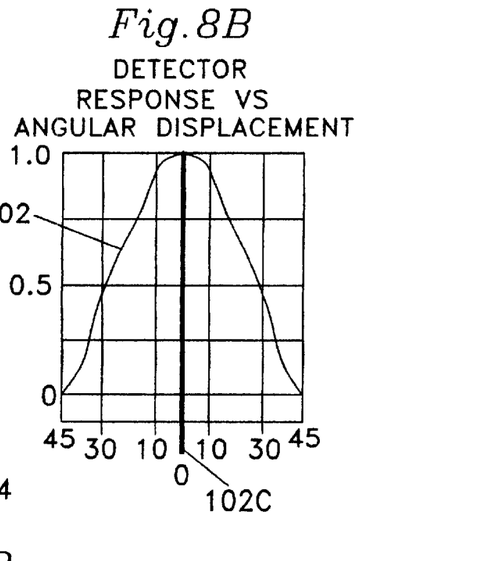
FIG. 8B is a graphical representation of the sensitivity or response of a typical detector as a function of the angular displacement from the detector centerline.

Continuing reference to FIG. 5, there is shown Darlington transistor light detector in a side-looking case or package 44. The actual light detecting element 74 is embedded in the polymer detector package 44. In a preferred construction the light detecting parts including the active element 74 and lens 76 are positioned near one end of package 46. The sensitivity of the detector is increased by the provision of light receiving and focusing lens 76 which receives light and concentrates and focuses the light onto the actual active Darlington transistor 74. FIG. 8B displays a graphical statement of the variation of the light sensitivity of the Darlington Light Detector Package QSE133 as a function of the angular departure from the centerline of the detector lens. FIG. 8B shows that for this detector a 50 percent cone of sensitivity arises at an angular distance of about 30 degrees from the central axis 102C.

Figure 7A:
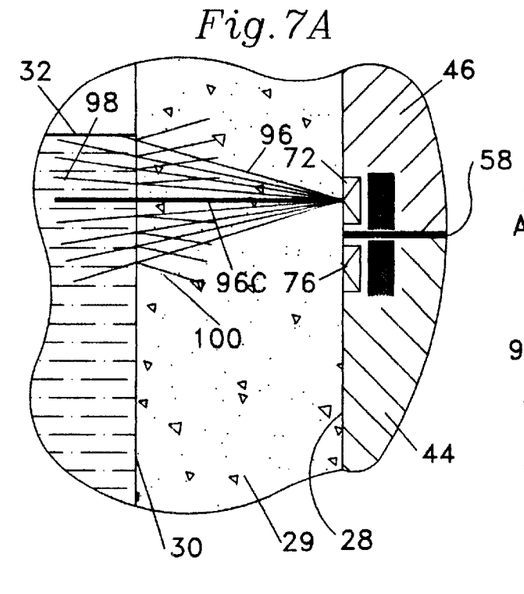
FIG. 7A illustrate-the situation arising with higher liquid level on the inside of the window. The relative positions of the light source and light transducer of the invention positioned with parallel centerlines or axis', perpendicular to the window faces and close together are shown. The light paths generated by the LED with high oil level, whereby less light is reflected back to the detector and more is transmitted into the oil is demonstrated.
Figure 7B:
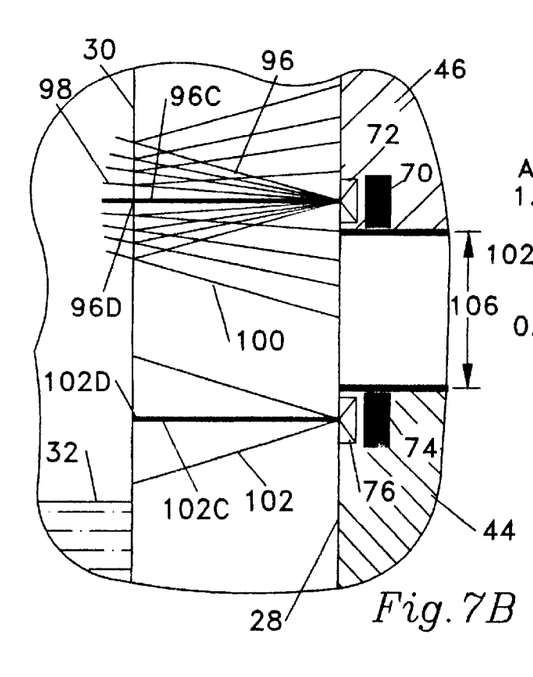
Figure 7C:
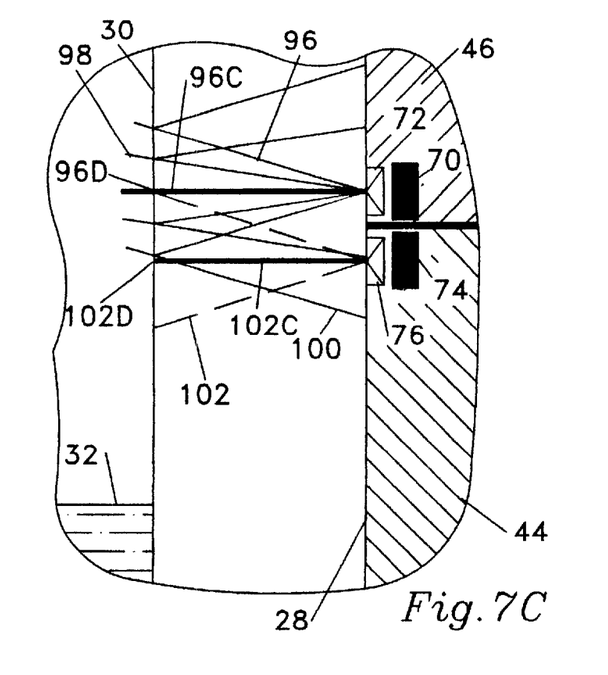
FIG. 7C shows the cone of response of the detector overlapping the illuminated zone of the LED whereby, even with the axis' of the LED and detector parallel and perpendicular to the window, the detector receives sufficient light on low oil level to generate an effective response.
Figures 7D, 9B:
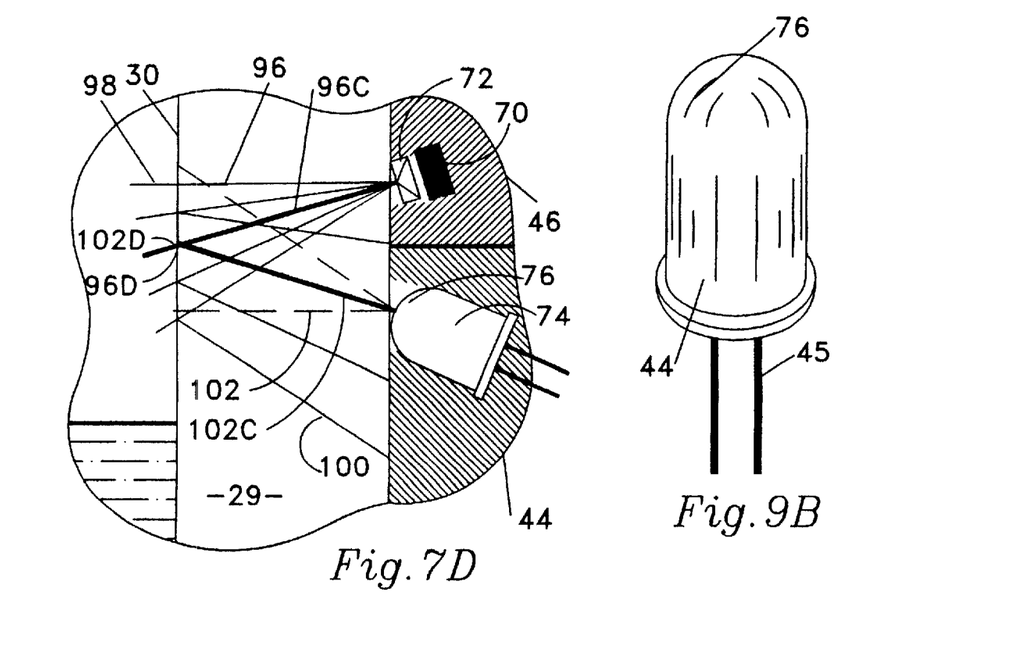
FIG. 7D illustrates the increased effectiveness of response of the detector when the axis' of the detector and the LED are both non-perpendicular to the planar surfaces of the window but their axis' converge at a point at the inner window surface.
FIG. 9B shows the exterior bullet shape of substantially externally identical LED and light detector packages.

In the embodiments of the invention of FIGS. 4, 7A and 7C where the central axis' of the LED and light detector are positioned perpendicular to the external active surface 43 of module 40, it is an important construction feature of the invention that the LED module 44 and the light sensing module 46 be positioned so that their active elements within each module are closely adjacent, separated only by the opaque separator 58 as shown in FIG. 5 and FIGS. 7A and 7C in order to best ensure that there is adequate detector sensitivity to respond to the changes in light intensity. See also the discussion for FIG. 7B.

Referring now to the electrical schematic diagram of FIG. 6A, there is shown one possible circuit 87 embodied within module 40. Three wire leads comprising lead group 42 of FIGS. 1, 2 and 3 extend from module 40. Lead 86 of that group 42 is the lead which connects to the positive side of the power supply. Lead 90 is the wire of that group 42 which connects to the negative side of the power supply. Lead 88 of group 42 is the lead whose voltage with respect to lead 90 varies as a function of the conductivity and therefore of the amount of light impinging on light detector 44. It is across these two leads of group 42, lead 88 and lead 90, that relay 92 is connected. LED 46 is connected across the 12 volt DC supply through voltage dropping or limiting resistor 96. Resistor 96 has a typical value of 5500 ohms for use with the QEE113 LED. Light sensitive Darlington transistor 44 has a high electrical resistance in the absense of light, and a sharply reduced electrical resistance when illuminated. Resistor 94, typically having a resistance of 169,000 ohms, acts as load resistor. Under low light conditions there is minimum current flow through Darlington transistor 44 and therefore low voltage across resistor 94 and higher voltage across the Darlington 44. As the Darlington light sensor 44 receives more light, it allows greater current flow and a higher voltage drop across resistor 94 and a lower voltage across Darlington 44 arises.

A high impedance relay 92 is connected across Darlington light sensor 44. The relay acts in response to the voltage across the Darlington 44. The voltage across Darlington 44 is higher when the resistance of the Darlington 44 is higher. This condition occurs when less light reaches the Darlington 44 and its resistance is higher. Device 93, typically an alarm, an electric valve or a timer, acts in response to the voltage across Darlington light sensor 44 to activate and alarm or perform other activities a designer deems appropriate at conditions of higher liquid level 34 or lower liquid level 32 (FIG. 1). It should be emphasized that other arrangements of electronic components can be employed to coact with the light source 46 and detector 44 to secure the desired results of alerting, warning and acting on high or low oil or liquid levels.

Referring now to FIGS. 7A, 7B, 7C and 7D there is shown in FIG. 7A an approximate graphical representation of the effect of the presence of higher liquid level 34. In FIG. 7A, light 96, emitted by LED 46 in a conical range of intensities along central axis 96C (see also FIG. 8A), is transmitted in greater part 98 into the liquid at the higher liquid level 34 (see FIG. 1) and reflected 100 in lesser part. The cone of response (see also FIG. 8B) of light detector 44 (Darlington 44) is not shown to allow clear representation of the light pattern of the LED.

FIG. 8A displays the approximate light intensity (Vertical axis, 0 to 1.0) provided by the LED as a function of the angular displacement from a central axis or centerline (Horizontal axis, 60-0-60).

Referring again to FIG. 7A there is shown LED light emitting diode 70 and lens 72 positioned within LED package 46. In FIG. 7A the directions and variations in light intensity is very approximately illustrated by the directions and lengths of lines 96. Heavier line 96C represents the intensity and direction of the central axis of light delivery by the LED at zero angular displacement, corresponding to 96C centerline or central axis of FIG. 8A.

Referring now to FIG. 7B, two different effects are displayed. First: the monitored liquid level 32 is lower than the zone of light emitted by LED 46. Therefore only a small fraction 98 of the light emitted by LED 70 is transmitted across the vapor glass interface (inner planar surface 30 of window 29) into the vapor space. A correspondingly large fraction of the light emitted from the LED is reflected at the window inner planar surface 30 in intense light rays 100. Second: the light detector 44 cannot respond to the higher reflected light intensity because its zone of response 102, having a central axis 102C positioned perpendicular to the active face of the device, is separated from LED 45 by a distance 106 and in particular does not include the point of intersection of the central axis of light delivery of the LED 46 with a cone of 50 percent or greater sensitivity to ensure sufficient light pickup from the LED.

Second: if the light detector 44 had been closely adjacent LED 46, as shown in FIG. 7A, the cone of response 102 of light detector 44 would have encompassed the more intense light rays 100 reflected from the inner window surface 30 light detector 44 would have had enough light 100 to activate the electronics and provide an alarm or a corrective action. Therefore, to meet the requirements of the invention, the zone of response or sensitivity 102 of the light detector 44 of at least 25% and preferably 50% must include the point of intersection of the central axis with inner surface 30 of window 29 as shown in FIG. 7C. In another preferred embodiment of the invention, the central axis of the light detector 102C will intersect and substantially coincide with the intersection of the central axis of the light emitter thereby ensuring adequate zone of sensitivity coverage.

The closely adjacent structure of the assembly is shown in FIG. 7C. There LED 46 is closely adjacent the detector 44 and the detector zone of sensitivity 102 encompasses the intersection point 30 of the central axis of the LED on the inner surface of window 29. The detector 44 is therefore able to react effectively to the presence of both lesser light intensity on a condition of higher liquid level on the inside surface 30 of window 29 and higher light intensity when the liquid level is lower.

Referring again to FIG. 7B, LED-lens combination 70, 72 provides maximum light intensity along centerline 96C and reduced light intensities along other light paths 96. Low intensity light rays 98 are transmitted through the planar inner window side 30 into the vapor above liquid level 32. Relatively higher intensity light rays are reflected at inner planar window surface 30 back over a range of light paths 100, some of which reach Darlington detector 74 though its collecting lens 76. The illumination level of the Darlington detector 74 (package 44) causes it to have a lower electrical resistance thereby causing a lower electrical potential to arise across the Darlington detector 44 (FIG. 6A).

FIG. 8B illustrates the response of the Darlington detector QSE133 to light. The graph of FIG. 8B shows that for the QSE133 the detector response varies as a function of the conical angle of the field from its central axis (horizontal axis having a range of 45, 0, 45). The "cone of sensitivity" of the detector 44 is defined, for the purposes of this specification, as that conical angle at which the detector response is 0.5. The maximum response "1.0" arises at the centerline "0" with lesser responses as the light source deviates from the central axis "0" of the detector 74. For the QSE113 the "cone of suitable sensitivity" is 30 degrees. However, depending on the sensitivity of the electronics and other external components a lower zone of sensitivity such as 25% may be suitable.

In FIG. 7D LED, element 70 and accompanying lens 72 have been positioned at an angle other than 90 degrees to the active surface of the construction and to the outer face 28 and the parallel inner face 30 of window 29. The LED angle has been selected to bring the point of intersection of the central axis 96C of the LED closer to the position of the light detector 76. In FIG. 7D a bullet shaped light detector 76 has been positioned at such an angle that its axis of sensitivity 102C intersects the inner window surface 30 at the a position 96D that is coincident with the point of intersection of the central axis 102C of the LED, thereby providing a high degree of responsiveness by the detector 76 to the light reflected from the inner surface 30 of window 29.

It should be noted that potting material 41 of module 40 is identified by the numeral 41 in FIG. 4 but no hatching is shown to avoid confusion. In preferred embodiments of the invention there is no potting material between the active face 43 of the module and either the active parts of light emitter 46 or light detector 44.

From the foregoing description, it can be seen that the present invention comprises an unobvious and untaught construction for electro-optically reacting to changes in liquid level through a non-prismatic planar-planar window. It will be appreciated by those skilled in the art that changes could be made to the embodiments described in the foregoing description without departing from the broad inventive concept thereof. It is understood, therefore, that this invention is not limited to the particular embodiment or embodiments disclosed and claimed, but is intended to cover all modifications and equivalents of claimed elements which are within the scope and spirit of the invention as Set forth in the claims and described in the specification.

I claim:

1. Opto-electronic means for distinguishing between the presence of liquid and the vapor above the liquid adjacent a window in a container wall, the liquid having changeable levels;

said window having a planar outer face and a substantially parallel planar inner face in contact with the liquid or vapor, opto-electronic means comprising a construction having an active face adjacent the window planar outer face, a light source having a position and an axis of light emission, said axis being directed toward the active face of the opto-electronic means and through the window outer face to the window inner face, the light from the source being reflected from the window inner face in greater and lesser amounts in response to the presence of vapor or liquid adjacent the window inner face, said opto-electronic means further including light detector means for electrically responding to the amount of light reflected from the window inner face reaching the detector, the detector means having an axis of and a cone of light sensitivity directed toward the active face of the opto-electronic means and through the window outer face to the window inner face, and electronic means subject to the light detector means for responding to electrical changes in the light detector means resulting from changes in light reflected from the window inner face, whereby the presence of liquid or vapor on the window inner face surface is opto-electrically determined.

2. Opto-electronic means for distinguishing between the presence of liquid and vapor adjacent a window in a container wall as recited in sclaim 1, further providing that the axis of emission of the light source and the axis of sensitivity of the light detector are perpendicular to the active face of the opto-electronic means.

3. Opto-electronic means for distinguishing between the presence of liquid and vapor inside a container as recited in claim 2 and further providing that the active face of the opto-electronic means is positioned against the outer window face and the axis of emission of the light source intersects the window inner face at a first point and the said first point is within the cone exhibiting greater than 25 percent sensitivity of the light detector.

4. Opto-electronic means for distinguishing between the presence of liquid and the vapor above the liquid adjacent a window in a container wall, as recited in claim 1 and further providing that the active face of the opto-electronic means is positioned against the outer window face and the axis of emission of the light source intersects the window inner face at a first point and light detector is positioned so its axis of sensitivity intersects the first point.

5. Opto-electronic means for distinguishing between the presence of liquid and the vapor above the liquid adjacent a window in a container wall as recited in claim 3 and further providing that the electronic means subject to the light detector means is positioned within the construction.

6. Opto-electronic means for distinguishing between the presence of liquid and the vapor above the liquid adjacent a window in a container wall as recited in claim 3 and further providing that the electronic means subject to the light detector means is positioned outside the construction.

7. Opto-electronic means for distinguishing between the presence of liquid and the vapor above the liquid adjacent a window in a container wall as recited in claim 1, and the axis of emission of the light source intersects the window inner face at a first point and said first point is within the cone exhibiting greater than 25 percent sensitivity of the light detector.

8. Opto-electronic means for distinguishing between the presence of liquid and the vapor above the liquid adjacent a window in a container wall as recited in claim 7 and further providing that the electronic means subject to the light detector means is positioned within the construction.

9. Opto-electronic means for distinguishing between the presence of liquid and the vapor above the liquid adjacent a window in a container wall as recited in claim 7 and further providing that the electronic means subject to the light detector means is positioned outside the construction.

10. Opto-electronic means for distinguishing between the presence of liquid and the vapor above the liquid adjacent a window in a container wall as recited in claim 4 and further providing that the electronic means subject to the light detector means is positioned within the construction.

11. Opto-electronic means for distinguishing between the presence of liquid and the vapor above the liquid adjacent a window in a container wall as recited in claim 4 and further providing that the electronic means subject to the light detector means is positioned outside the construction.

* * * * *